US010795682B2

(12) United States Patent
Ido et al.

(10) Patent No.: US 10,795,682 B2
(45) Date of Patent: Oct. 6, 2020

(54) GENERATING VECTOR BASED SELECTION CONTROL STATEMENTS

(71) Applicant: Intel Corporation, Santa Clara, CA (US)

(72) Inventors: Hideki Saito Ido, Sunnyvale, CA (US); Eric N Garcia, Redwood City, CA (US); Xinmin Tian, Union City, CA (US); Milind B. Girkar, Sunnyvale, CA (US); James Brodman, Marlborough, MA (US)

(73) Assignee: Intel Corporation, Santa Clara, CA (US)

( * ) Notice: Subject to any disclaimer, the term of this patent is extended or adjusted under 35 U.S.C. 154(b) by 256 days.

(21) Appl. No.: 15/391,915

(22) Filed: Dec. 28, 2016

(65) Prior Publication Data
US 2018/0181404 A1   Jun. 28, 2018

(51) Int. Cl.
*G06F 9/38* (2018.01)
*G06F 9/30* (2018.01)
*G06F 15/76* (2006.01)

(52) U.S. Cl.
CPC ........ *G06F 9/3844* (2013.01); *G06F 9/30058* (2013.01); *G06F 9/3806* (2013.01); *G06F 15/76* (2013.01)

(58) Field of Classification Search
CPC .. G06F 9/3844; G06F 9/30058; G06F 9/3806; G06F 8/4441; G06F 8/445
See application file for complete search history.

(56) References Cited

U.S. PATENT DOCUMENTS

| 5,093,916 A | * | 3/1992 | Karp | G06F 9/52 717/114 |
| 5,339,420 A | * | 8/1994 | Hoxey | G06F 8/443 717/151 |

(Continued)

FOREIGN PATENT DOCUMENTS

WO   PCT/IB2016/000404   3/2016

OTHER PUBLICATIONS

Robert L. Bernstein. 1985. Producing good code for the case statement. Softw. Pract. Exper. 15, 10 (Oct. 1985), 1021-1024. (Year: 1985).*

(Continued)

*Primary Examiner* — Aimee Li
*Assistant Examiner* — Kasim Alli
(74) *Attorney, Agent, or Firm* — Hanley, Flight & Zimmerman, LLC

(57) ABSTRACT

In one example, a system for generating vector based selection control statements can include a processor to determine a vector cost of the selection control statement is below a scalar cost and determine the selection control statement is to be executed in a sorted order based on dependencies between branch instructions of the selection control statement. The processor can also determine a program ordering of labels of the selection control statement does not match a mathematical ordering of the labels and execute the selection control statement with a vector of values, wherein the selection control statement is to be executed based on a jump table and a sorted unique value technique, wherein the sorted unique value technique comprises selecting at least one of the plurality of branch instructions from the jump table.

24 Claims, 4 Drawing Sheets

(56) References Cited

U.S. PATENT DOCUMENTS

| | | | |
|---|---|---|---|
| 8,949,808 | B2 | 2/2015 | Gonion |
| 9,015,688 | B2 | 4/2015 | Tian et al. |
| 9,086,873 | B2 | 7/2015 | Astigeyevich et al. |
| 9,298,435 | B2 | 3/2016 | Kawahito |
| 2012/0079466 | A1 | 3/2012 | Gonion |
| 2013/0339682 | A1 | 12/2013 | Uliel et al. |
| 2014/0237217 | A1* | 8/2014 | Schmidt ............... G06F 8/443 |
| | | | 712/222 |
| 2015/0007154 | A1 | 1/2015 | Bharadwaj et al. |

OTHER PUBLICATIONS

EventHelix.com, C to assembly: if and switch statements, Dec. 18, 2015, (Year: 2015).*

Sayle, Roger. (2008). A Superoptimizer Analysis of Multiway Branch Code Generation. (Year: 2008).*

Jason D. Hiser, Daniel Williams, Wei Hu, Jack W. Davidson, Jason Mars, and Bruce R. Childers. 2007. Evaluating Indirect Branch Handling Mechanisms in Software Dynamic Translation Systems. In Proceedings of the International Symposium on Code Generation and Optimization (CGO '07). (Year: 2007).*

International Search Report, PCT Application No. PCT/US2017/061713, dated Feb. 9, 2018, 3 pages.

International Search Report for related PCT Application PCT/IB2016/000404 with a completion date of May 31, 2016 and dated Jun. 8, 2016, 2 pages.

* cited by examiner

GENERATING VECTOR BASED SELECTION CONTROL STATEMENTS

TECHNICAL FIELD

This disclosure relates generally to selection control statements and specifically, but not exclusively, to generating vector based selection control statements.

BACKGROUND

Computing devices use a multitude of various programming languages to provide instructions for processors in the computing devices to execute. In some examples, programming languages can control a flow of execution of instructions in an application. For example, programming languages can use selection control statements, among others, to indicate braches in the control flow of an application.

BRIEF DESCRIPTION OF THE DRAWINGS

The following detailed description may be better understood by referencing the accompanying drawings, which contain specific examples of numerous features of the disclosed subject matter.

FIG. 4 is an example block diagram of a non-transitory computer readable media for generating vector based selection control statements; and In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
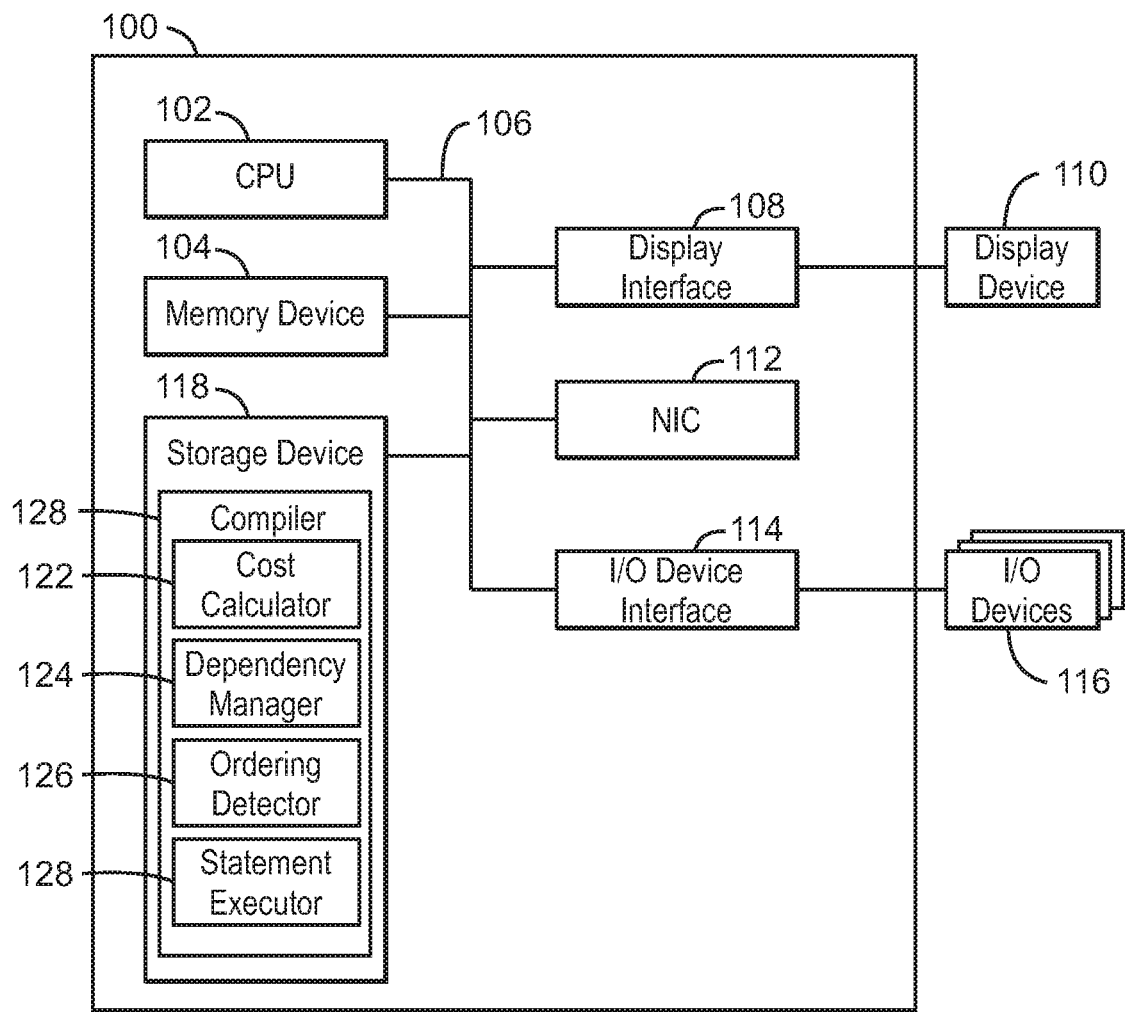
FIG. 1 illustrates a block diagram of a computing device that can generate vector based selection control statements.

As discussed above, computing devices can use any number of programming languages to implement selection control statements. A selection control statement, as referred to herein, can include any operation that can provide a multiway branch of control flow of an application. The selection control statement can include any number of labels that correspond to any number of branch instructions. A label, as referred to herein, can be a value that indicates particular branch instructions are to be executed. For example, a selection control statement may include labels with values zero, ten, and twenty, among any other suitable values. In one example, labels zero, ten, and twenty can each correspond to a different set of branch instructions to be executed when the selection control statement receives a variable with a particular value matching a label. In some embodiments, a selection control statement can include a switch statement, among others. In some examples, compilers can interpret selection control statements as a sequence of conditional statements such as if-then-else expressions, among others.

The techniques described herein include a system that can generate a vector based selection control statement. While many computing devices can execute instructions based on a single value, some computing devices can execute an instruction with multiple data values. These computing devices can exploit data level parallelism by executing an instruction with multiple data values at any given time. A vector based selection control statement, as referred to herein, can include any control statement which can be executed a single time with multiple data values. In some embodiments, techniques for generating a vector based selection control statement can include determining that a vector cost of the selection control statement is below a scalar cost. For example, the execution time of a selection control statement based on a vector of values may be less than the execution time of the selection control using scalar execution techniques such as executing the selection control statement for each data value one at a time.

The techniques described herein can also include executing the selection control statement as a vector based selection control statement, wherein the vector based selection control statement detects a vector with multiple values corresponding to labels from the selection control statement to be executed. In some embodiments, techniques include determining that the selection control statement is to be executed in a sorted order based on dependencies between a first sequence of statements or branch instructions corresponding to a first label and a second sequence of statements or branch instructions corresponding to a second label. Furthermore, the techniques described herein can include determining a mathematical ordering of the selection control statement labels does not match a program ordering of the labels of the selection control statement. A program ordering, as referred to herein, can include a sequence in which labels of the selection control statement are executed. For example, the program ordering can indicate that a sequence of labels with values zero, ten, and twenty can be executed or a sequence of labels with ten, zero, and twenty can be executed. In addition, the techniques described herein can include executing the selection control statement based on a jump table and a sorted unique value technique, wherein the sorted unique value technique comprises sorting a vector of values to execute with the selection control statement and selecting branch instructions from the jump table accordingly. A jump table, as referred to herein, can include pointers to branch instructions for any number of labels. By using a jump table in conjunction with various vector based selection control statement techniques described below, the techniques described herein can reduce the execution time of an application. For example, rather than executing a series of if-then statements in an application, the techniques described herein can enable a system to execute a single instance of a vector based selection control statement based on a vector of values. For example, scalar and vector techniques can result in multiple condition evaluations for if-then statements, while vector based selection control statements can enable evaluating conditions for multiple vector elements simultaneously.

The techniques herein enable a compiler to generate modified binary code that can be executed faster at runtime, which can reduce power consumption of devices. In some embodiments, the techniques herein generate the modified binary code in response to detecting that executing a selection control statement with a vector of values is faster than executing the selection control statement multiple times for a number of single values. Additionally, the techniques herein can generate the modified binary code in response to detecting that executing a selection control statement with a vector of values is faster than converting a selection control statement to a series of nested if-then statements and vectorizing the nested if-then statements.

Reference in the specification to "one embodiment" or "an embodiment" of the disclosed subject matter means that a particular feature, structure, or characteristic described in connection with the embodiment is included in at least one embodiment of the disclosed subject matter. Thus, the phrase "in one embodiment" may appear in various places throughout the specification, but the phrase may not necessarily refer to the same embodiment.

FIG. 1 is a block diagram of an example of a computing device that can generate a vector based selection control statement. The computing device 100 may be, for example, a mobile phone, laptop computer, desktop computer, or tablet computer, among others. The computing device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. In some embodiments, the processor 102 can support executing a single instruction with multiple data values. The memory device 104 can include random access memory, read only memory, flash memory, or any other suitable memory systems. The instructions that are executed by the processors 102 may be used to implement a method that can generate a vector based selection control statement.

The processors 102 may also be linked through the system interconnect 106 (e.g., PCI®, PCI-Express®, NuBus, etc.) to a display interface 108 adapted to connect the computing device 100 to a display device 110. The display device 110 may include a display screen that is a built-in component of the computing device 100. The display device 110 may also include a computer monitor, television, or projector, among others, that is externally connected to the computing device 100. The display device 110 can include light emitting diodes (LEDs), and micro-LEDs, among others.

In addition, a network interface controller (also referred to herein as a NIC) 112 may be adapted to connect the computing device 100 through the system interconnect 106 to a network (not depicted). The network (not depicted) may be a cellular network, a radio network, a wide area network (WAN), a main area network (LAN), or the Internet, among others.

The processors 102 may be connected through a system interconnect 106 to an input/output (I/O) device interface 114 adapted to connect the computing device 100 to one or more I/O devices 116. The I/O devices 116 may include, for example, a keyboard and a pointing device, wherein the pointing device may include a touchpad or a touchscreen, among others. The I/O devices 116 may be built-in components of the computing device 100, or may be devices that are externally connected to the computing device 100.

In some embodiments, the processors 102 may also be linked through the system interconnect 106 to any storage device 118 that can include a hard drive, an optical drive, a USB flash drive, an array of drives, or any combinations thereof. In some embodiments, the storage device 118 can include any suitable applications. For example, the storage device 118 can include a cost calculator 120, a dependency manager 122, an ordering detector 124, and a statement executor 126. In some embodiments, the cost calculator 120 can determine a vector cost of the selection control statement is below a scalar cost. In some examples, the cost calculator 120 can determine a scalar cost of a selection control statement by aggregating the execution time of each instruction type. In some examples, the cost calculator 120 can determine a vector cost of a selection control statement based on a number of executions of instructions and the instruction type of each instruction. For example, the cost calculator 120 may detect that a vector based selection control statement can be executed a fewer number of times than the scalar equivalent of the selection control statement.

In some embodiments, a dependency manager 122 can determine the selection control statement is to be executed in a sorted order based on dependencies between branch instructions of the selection control statement. For example, the dependency manager 122 can determine that at least one label in the selection control statement is dependent upon a second label. In some embodiments, an ordering detector 124 can determine a mathematical ordering of the selection control statement labels does not match a program ordering of the labels of the selection control statement. For example, the ordering detector 124 can detect that labels in the selection control statement are not based on linearly increasing mathematical values. In some examples, the ordering detector 124 can detect that a program ordering of sequential labels of the selection control statement may include values that increase and decrease in a non-linear sequence or pattern. In some embodiments, a statement executor 126 can execute the selection control statement based on a jump table and a sorted unique value technique, wherein the sorted unique value technique comprises selecting a branch instruction from the jump table. A jump table, as referred to herein, can include pointers to instructions to be executed based on the selection control statement. For example, the jump table can indicate a pointer to an address for a branch in the control flow of an application. A sorted unique value technique, as referred to herein, can include sorting a vector of values to be executed by the selection control statement to preserve dependency relationships. In some embodiments, the cost calculator 120, dependency manager 122, ordering detector 124, and statement executor 126 can be included in a compiler 128 that may perform additional operations discussed below in relation to FIG. 3.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, additional modules, additional network interfaces, etc.). Furthermore, any of the functionalities of the cost calculator 120, dependency manager 122, ordering detector 124, statement executor 126, and compiler 128 may be partially, or entirely, implemented in hardware and/or in the processors 102. For example, the functionality may be implemented with an application specific integrated circuit, logic implemented in an embedded controller, or in logic implemented in the processors 102, among others. In some embodiments, the functionalities of the cost calculator 120, dependency manager 122, ordering detector 124, statement executor 126, and compiler 128 can be implemented with logic, wherein the logic, as referred to herein, can include any suitable hardware (e.g., a processor, among others), software (e.g., an application, among others), firmware, or any suitable combination of hardware, software, and firmware.

Figure 2:
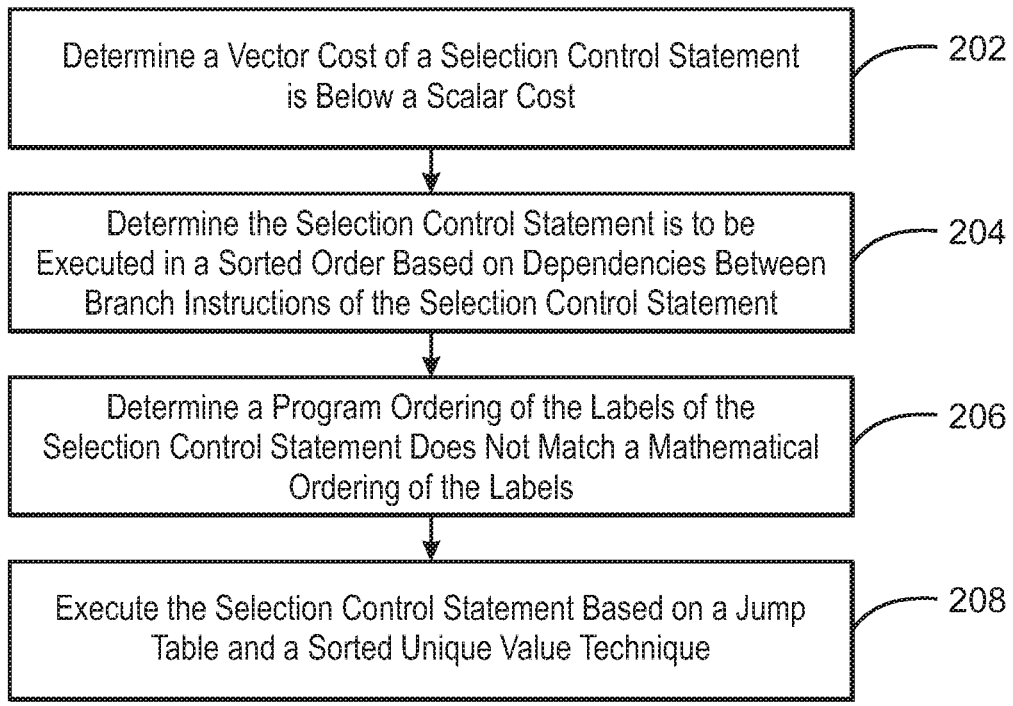
FIG. 2 illustrates a process flow diagram for generating vector based selection control statements based on a jump table and a sorted unique value technique.

FIG. 2 illustrates a process flow diagram for generating a vector based selection control statement based on a jump table and a sorted unique value technique. The method 200 illustrated in FIG. 2 can be implemented with any suitable computing component or device, such as the computing device 100 of FIG. 1.

At block 202, the cost calculator 120 can determine a vector cost of the selection control statement is below a scalar cost. In some embodiments, the cost calculator 120 can determine a scalar cost of a selection control statement by aggregating the execution time of each instruction type based on a single value. In some examples, the cost calculator 120 can determine a vector cost of a selection control statement based on a number of executions of instructions based on multiple values and the instruction type of each instruction. For example, the cost calculator 120 may detect that a vector based selection control statement can be executed a fewer number of times than the scalar equivalent of the selection control statement.

At block 204, a dependency manager 122 can determine the selection control statement is to be executed in a sorted order based on dependencies between branch instructions of the selection control statement. For example, the dependency manager 122 can determine that at least one label in the selection control statement is dependent upon a second label. At block 206, an ordering detector 124 can determine a program ordering of labels of the selection control statement do not match a mathematical ordering of the labels. For example, the ordering detector 124 can detect that labels in the selection control statement are not based on linearly increasing mathematical values. In some examples, the ordering detector 124 can detect sequential labels based on any suitable value type.

At block 208, a statement executor 126 can execute the selection control statement based on a jump table and a sorted unique value technique, wherein the sorted unique value technique comprises selecting a branch instruction from the jump table. A jump table can include pointers to instructions to be executed based on the selection control statement. For example, the jump table can indicate a pointer to an address for a branch in the control flow of an application. A sorted unique value technique can include sorting a vector of values to be executed by the selection control statement to preserve dependency relationships. Executing the selection control statement is described in greater detail below in relation to FIG. 3.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
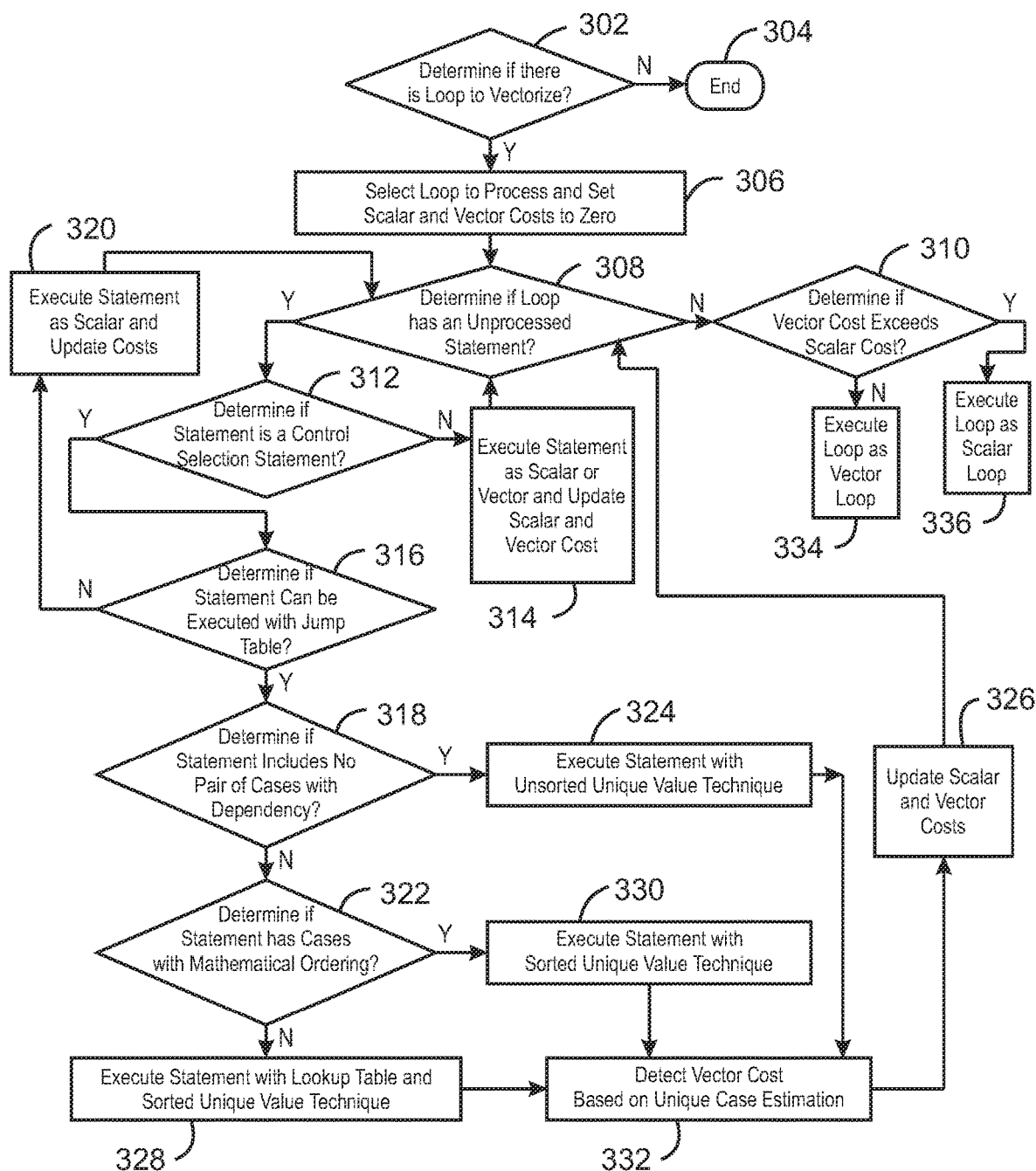
FIG. 3 illustrates a process flow diagram for generating vector based selection control statements.

FIG. 3 illustrates a process flow diagram for generating a vector based selection control statement. The method 300 illustrated in FIG. 3 can be implemented with any suitable computing component or device, such as the computing device 100 of FIG. 1.

At block 302, a compiler can determine if there is a loop to vectorize in the source code of an application being compiled. Vectorization, as discussed above, can include transforming an instruction or set of instructions to be executed with a set of values rather than a single value. For example, vectorizing a loop can include executing instructions in a "for" instruction statement with a single execution based on a vector of values rather than multiple executions of the "for" instruction statement with a single value. In some examples, a compiler can also vectorize a function context or a function, wherein the function vectorization has an implicit loop. In some examples, a scalar execution of an instruction can include executing an instruction with a single value. If the source code does not have a loop to vectorize, the process ends at block 304. If the source code does have a loop to vectorize, the process continues at block 306.

At block 306, the compiler can select the loop to vectorize and assign a zero value to a scalar cost and a vector cost. The scalar cost, as referred to herein, can indicate an estimated execution time of an instruction based on scalar execution techniques. For example, the scalar cost can indicate an execution time of any number of instructions in the loop, wherein the instructions are executed with a single value. The vector cost, as referred to herein, can indicate an execution time of an instruction or set of instructions based on vector execution techniques. For example, the vector cost can indicate an execution time of an instruction in the loop based on a single execution with a vector of values.

At block 308, the compiler can determine if the selected loop includes any unprocessed statements. Processing a statement can include determining if the execution time of a statement is faster based on a scalar execution with a single value or a vector execution with multiple values. The statements of the loop can be processed with blocks 312-332 below. If the selected loop does not have any additional unprocessed statements, the process flow continues at block 310, which is discussed in greater detail below. If the selected loop does have unprocessed statements, the process flow continues at block 312.

At block 312, the compiler can determine if the unprocessed statement from the selected loop is a selection control statement. As discussed above, a selection control statement can include any suitable operation that can provide a multiway branch of control flow of an application. For example, a selection control statement can include a switch statement, among others. A selection control statement can include any suitable number of labels corresponding to any number of branch instructions. The compiler can compare a value of a variable passed to the selection control statement to the labels to determine a match. For example, a selection control statement may select a label based on a value of a variable X. The selection control statement can indicate that branch instructions corresponding to a label with the value of the variable X are to be executed. By contrast, examples of statements that are not selection control statements can include if-then-else statements, for loops, mathematical operations, and the like. Statements that are not selection control statements may not enable an application to perform a multiway branch of control flow. In some embodiments, the compiler can generate a jump table from a cascaded-if statement or convert a subset of the selection control statement into a cascaded-if statement. A jump table can enable the compiler to detect branch instructions to execute without evaluating a series of conditional statements from a series of if-then statements. If the statement is not a selection control statement, the process flow continues at block 314. At block 314, the compiler can execute the statement as a scalar operation with a single value or a vector operation with multiple values and compute scalar execution costs or vector execution costs update the scalar costs and vector costs for the loop accordingly before returning to block 308. In some embodiments, the vector cost is not increased following block 308, while the scalar cost is increased based on an execution time of the statement in block 308.

If the statement is a selection control statement, the process flow continues at block 316 where the compiler determines if the statement can be executed with a jump table. For example, a jump table or a branch table can transfer program control to another part of the program or to a separate dynamically loaded program. If the selection control statement does not involve a jump table, the process flow can continue at block 320. If the selection control statement does involve a jump table, the process flow can continue at block 318. At block 320, the compiler can execute the selection control statement using any suitable technique, such as a nested if statement, among others, and update the scalar costs and vector costs for the loop. In some embodiments, a scalar cost for each data value can be calculated based on multiplying a number of conditions in a series of if-then statements by 0.5 and adding the result to a sum of the statement execution cost divided by a number of if-then conditions. In some embodiments, a vector cost for a vector of values can be calculated based on a number of if-then conditions for a mask value creation plus a sum of the statement execution cost based on the mask value. A mask value can be a vector of Boolean true or false values that indicate whether each element of a vector is to be executed for a particular label. The process flow can return to block 308 following block 320.

In some embodiments, at block 318 the compiler can determine if the selection control statement does not include a pair of cases or labels with a dependency, wherein the pair of cases or labels includes any number of corresponding branch instructions. For example, the selection control statement can include any number of labels or cases that correspond to any number of branch instructions. Each branch instruction can include a set of instructions to execute if a value provided to the selection control statement matches a label corresponding to the branch instruction. In some embodiments, the compiler can determine if branch instructions for a label in the selection control statement depend from branch instructions in a separate label of the selection control statement. For example, a selection control statement may include two separate labels or cases based on a variable with values ten and twenty respectively. In some examples, the branch instructions corresponding to the label executed when a variable value equals twenty may depend upon branch instructions that are executed when a variable value equals ten. If the compiler determines that any two cases of the selection control statement have a dependency, the process flow continues at block 322. If the compiler determines that the cases of the selection control statement do not have a dependency, the process flow continues at block 324.

At block 324, the compiler can execute the selection control statement with an unsorted unique value technique. In some examples, the compiler can populate a jump table based on the labels or cases in the selection control statement, wherein the jump table can be represented with any suitable data structure such as a vector, array, linked list, and the like. In one example, the compiler can create a jump table that stores values zero, ten, and twenty based on a selection control statement with labels equal to zero, ten, and twenty. At runtime, the compiler can detect a vector of values to execute labels or cases from the selection control statement and the compiler can detect pointers to the labels from the jump table. In an unsorted unique value technique, the compiler may not sort the vector of values used to execute the selection control statement. Rather, the compiler may execute branch instructions corresponding to a label with a value of twenty prior to executing branch instructions for a label with a value of ten. In some embodiments, the unsorted unique value technique may only execute branch instructions for a label once for each set of vector values.

For example, a vector of values to execute a selection control statement may include (100, 10, 10, 100), wherein the values 10 and 100 correspond to labels of the selection control statement. The compiler may select one of the values from the vector. For example, the compiler may select the value 100 and use a jump table based on the value 100 to execute instructions that set a mask value equal to true for the first and fourth values of the vector. The compiler can then execute vectorized branch instructions for the first and fourth vector values of 100, which correspond to the label of the selection control statement equal to 100. The compiler can then select the value of ten from the vector. The compiler can set a mask value corresponding to the label ten as true for the second and third values of the vector and execute branch instructions corresponding to the label ten as vectorized branch instructions based on the second and third values of the vector. The compiler can detect that there are not any additional unique values in the vector to execute and the unsorted unique value technique can terminate. The process continues at block 332, which is discussed below.

Returning to block 322, the compiler can determine if the selection control statement has a mathematical ordering. For example, the compiler can determine if a program ordering of the labels or cases of the selection control statement are organized based on linearly increasing or linearly decreasing number values. A program ordering, as discussed above, can include a sequence in which labels of the selection control statement are executed. For example, the program ordering can indicate that a sequence of labels with values zero, ten, and twenty can be executed or a sequence of labels with ten, zero, and twenty can be executed. In some embodiments, any data values that can be ordered can be used to control the selection control statement. If the labels of the selection control statement do not have a mathematical ordering, the process flow continues at block 328. If the labels of the selection control statement do have a mathematical ordering, the process flow continues at block 330.

At block 330, the compiler can execute the selection control statement with a sorted unique value technique. As discussed above, in some examples, the compiler can populate a jump table based on the labels or cases in the selection control statement, wherein the jump table can be represented with any suitable data structure such as a vector, array, linked list, and the like. In one example, the compiler can create a jump table that stores values zero, ten, and twenty based on a selection control statement with labels equal to zero, ten, and twenty. At runtime, the compiler can detect a vector of values to execute labels or cases from the selection control statement and the compiler can detect pointers to the labels from the jump table. In a sorted unique value technique, the compiler may sort the vector of values used to execute the selection control statement. For example, the compiler may execute branch instructions corresponding to a label with a value of ten prior to executing branch instructions for a label with a value of twenty. By executing branch instructions according to a mathematical ordering, the compiler can ensure that dependent branch instructions are executed following branch instructions from which they depend. For example, assuming that branch instructions for label twenty of a selection control statement depend from branch instructions for label ten of the selection control statement, the compiler can sort a vector of values to be executed so that label ten is executed prior to label twenty. In some embodiments, the sorted unique value technique may only execute branch instructions for a label once for each set of vector values. For example, the compiler may detect that a set of vector values indicating labels to execute includes the value ten multiple times. In some examples, the compiler may execute the label corresponding to the value ten once with multiple data values, wherein the multiple data values correspond to each of the values in the vector equal to ten. The process flow continues at block 332, which is discussed in greater detail below.

Returning to block 328, the compiler can execute the selection control statement with a lookup table and a sorted unique value technique. The lookup table, as referred to herein, can include any suitable data structure that can store index values indicating an order to follow when executing a jump table. For example, the compiler can detect that the labels or cases of the selection control statement may be organized in a non-linear manner. For example, the selection control statement may include cases or labels with sequential values of 1 0, 2, 5, 3, etc. The lookup table can map values to the jump table and execute the sorted unique value technique discussed above. For example, the compiler can detect a vector of values to be executed with the selection control statement and the compiler can sort the values using the lookup table so that label one is executed prior to label zero. The process flow continues at block 332.

At block 332, the compiler can detect a vector cost of the unique value techniques based on unique case estimation. In some examples, the sorted unique value technique has a greater vector cost or vector execution cost than the unsorted unique value technique. Also, using a lookup table in conjunction with the sorted unique value technique can also increase the vector execution cost. In some embodiments, the compiler can estimate a number of different labels or cases that are to be selected from the jump table at runtime. In some embodiments, estimating the number of different labels to be selected from a jump table can include a control divergence check that can be bounded by a number of unique cases within a single vector of values used to execute the selection control statement. The vector cost may be higher for the larger number of labels or cases selected. For example, selecting three labels or cases from the selection control statement may have a higher vector cost than selecting one or two labels or cases. In some embodiments, the compiler can estimate the labels or cases to be selected based on static or dynamic profile data. In some examples, the compiler can use static techniques to generate estimates of the number of labels that are to be executed. In some embodiments, a compiler can store branch frequency information for optimization. The compiler can use dynamic techniques to collect the branch frequency information from hardware or software instrumentation and estimate a number of labels to be executed based on the collected branch frequency information. The process flow continues at block 326.

At block 326, the compiler can update the scalar costs and the vector costs. For example, the compiler can estimate the cost of executing a selection control statement based on a number of jump tables to access and an execution time for performing an average case statement. The process flow returns to block 308. If there are not any additional statements to process from the selected loop, the process flow continues at block 310 where the compiler can determine if the vector cost of a loop exceeds a scalar cost. In some embodiments, the vector cost and the scalar cost of the selected loop can be aggregated based on vector costs and scalar costs for any number of statements within the selected loop. If the vector cost of a loop does not exceed the scalar cost, the process flow continues at block 334 where the compiler can execute the loop using vector techniques before ending. If the vector cost of a loop does exceed the scalar cost, the process flow continues at block 336 where the compiler can execute the loop using scalar techniques such as executing each statement with a single value before ending.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the compiler can also vectorize an indirect call by inlining a subset of candidate function callees using a jump table. Inlining, as referred to herein, can include generating a selection control statement based on branch instructions that include an indirect function call. For example, if the set of target functions are known at compile time, indirect call can be inlined using a jump table. For example, an application may include a series of if statements, wherein each if statement sets a function pointer to a particular memory address. In some embodiments, the series of if statements can be replaced with a selection control statement. For example, the following source code example illustrates a selection control statement that can utilize a jump table and can be executed as a vector based selection control statement:

switch (func_ptr){
case &foo: inlined body of foo( ); break;
case &foo1: inlined body of foo1( ); break;
case &fooN: inlined body of foo2( ); break;
. . .
case &fooN: inlined body of fooN( ); break;

In this example, the compiler can generate a jump table with labels corresponding to the values of &foo, &foo1, &foo2, . . . &fooN. The compiler can detect a vector of values or a set of values to execute the switch statement simultaneously and map the vector of values to the jump table based on an unsorted unique value technique, a sorted unique value technique, or a sorted unique value technique with a lookup table as described above in relation to FIG. 3.

Figure 4:
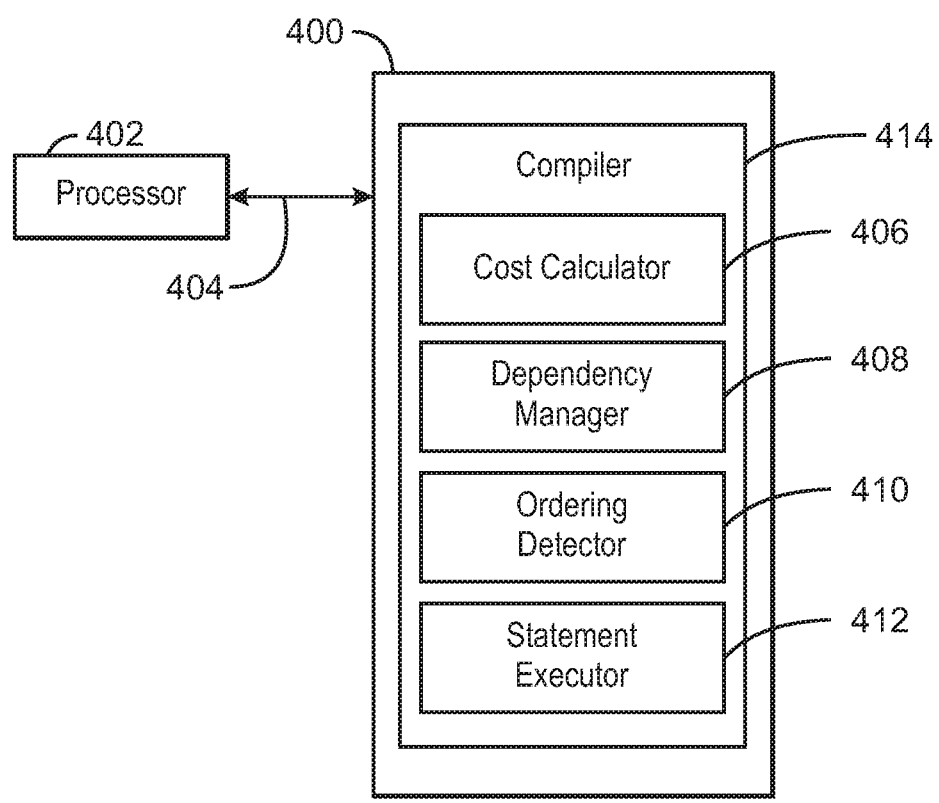

FIG. 4 is an example block diagram of a non-transitory computer readable media for generating a vector based selection control statement. The tangible, non-transitory, computer-readable medium 400 may be accessed by a processor 402 over a computer interconnect 404. Furthermore, the tangible, non-transitory, computer-readable medium 400 may include code to direct the processor 402 to perform the operations of the current method.

The various software components discussed herein may be stored on the tangible, non-transitory, computer-readable medium 400, as indicated in FIG. 4. For example, a cost calculator 406 can determine a vector cost of the selection control statement is below a scalar cost. In some embodiments, a dependency manager 408 can determine the selection control statement is to be executed in a sorted order based on dependencies between branch instructions of the selection control statement. In some embodiments, an ordering detector 410 can determine a program ordering of the labels of the selection control statement do not match a mathematical ordering. In some embodiments, a statement executor 412 can execute the selection control statement based on a jump table and a sorted unique value technique, wherein the sorted unique value technique comprises selecting a branch instruction from the jump table. In some examples, the cost calculator 406, dependency manager 408, ordering detector 410, and statement executor 412 can be included in a compiler 414, which can also implement additional techniques in according with FIG. 3 above.

It is to be understood that any suitable number of the software components shown in FIG. 4 may be included within the tangible, non-transitory computer-readable medium 400. Furthermore, any number of additional software components not shown in FIG. 4 may be included within the tangible, non-transitory, computer-readable medium 400, depending on the specific application.

Example 1

In some examples, a system for generating vector based selection control statements can include a processor that can determine a vector cost of a selection control statement is below a scalar cost and determine the selection control statement is to be executed in a sorted order based on dependencies between a plurality of branch instructions of the selection control statement. The processor can also determine a program ordering of labels of the selection control statement does not match a mathematical ordering of the labels and execute the selection control statement with a vector of values, wherein the selection control statement is to be executed based on a jump table and a sorted unique value technique, wherein the sorted unique value technique comprises selecting at least one of the plurality of branch instructions from the jump table.

Example 2

The system of Example 1, wherein the processor is to determine the vector cost based on an instruction type of each branch instruction in the selection control statement.

Example 3

The system of Example 1, wherein the processor is to determine the vector cost of the selection control statement is greater than the scalar cost of the selection control statement, and execute the selection control statement as a scalar loop.

Example 4

The system of Example 1, wherein the processor is to detect that the selection control statement is incompatible with a jump table technique, execute the selection control statement as a cascaded-if statement, and accumulate the scalar cost and the vector cost.

Example 5

The system of Example 1, wherein the processor is to determine that branch instructions of the selection control statement are not dependent, and execute the selection control statement based on an unsorted jump table.

Example 6

The system of Example 1, wherein the processor is to determine that the mathematical ordering of the selection control statement does match the program ordering of the selection control statement and execute the selection control statement based on a sorted jump table.

Example 7

The system of Example 1, wherein the processor is to evaluate the scalar cost and the vector cost based on an estimation of a number of unique cases from static or dynamic profile data.

Example 8

The system of Example 7, wherein the processor is to update the scalar cost and the vector cost based on the estimation.

Example 9

The system of Example 1, wherein the processor is to convert a subset of the selection control statement into a cascaded-if statement.

Example 10

The system of Example 1, wherein the processor is to generate the jump table from a cascaded-if statement.

Example 11

The system of Example 1, wherein a control divergence check is bounded by a number of unique cases within a single vector.

Example 12

The system of Example 1, wherein the processor is to vectorize an indirect call by inlining a subset of candidate callees using the jump table.

Example 13

In some embodiments, a method for generating vector based selection control statements can include determining a vector cost of a selection control statement is below a scalar cost and determining the selection control statement is to be executed in a sorted order based on dependencies between a plurality of branch instructions of the selection control statement. The method can also include determining a program ordering of labels of the selection control statement does not match a mathematical ordering of the labels, and executing the selection control statement with a vector of values, wherein the selection control statement is to be executed based on a jump table and a sorted unique value technique, wherein the sorted unique value technique comprises selecting at least one of the plurality of branch instructions from the jump table.

Example 14

The method of Example 13 comprising determining the vector cost based on an instruction type of each branch instruction in the selection control statement.

Example 15

The method of Example 13 comprising determining that branch instructions of the selection control statement are not dependent, and executing the selection control statement based on an unsorted jump table.

Example 16

The method of Example 13 comprising determining that the mathematical ordering of the selection control statement does match the program ordering of the selection control statement, and executing the selection control statement based on a sorted jump table.

Example 17

The method of Example 13 comprising evaluating the scalar cost and the vector cost based on an estimation of a number of unique cases from static or dynamic profile data.

Example 18

The method of Example 17, comprising updating the scalar cost and the vector cost based on the estimation.

Example 19

The method of Example 13 comprising converting a subset of the selection control statement into a cascaded-if statement.

Example 20

The method of Example 13 comprising generating the jump table from a cascaded-if statement.

Example 21

The method of Example 13, wherein a control divergence check is bounded by a number of unique cases within a single vector.

Example 22

The method of Example 13 comprising vectorizing an indirect call by inlining a subset of candidate callees using the jump table.

Example 23

In some embodiments, a non-transitory computer-readable medium for generating vector based selection control statements can include a plurality of instructions that in response to being executed by a processor, cause the processor to determine a vector cost of the selection control statement is below a scalar cost and determine the selection control statement is to be executed in a sorted order based on dependencies between branch instructions of the selection control statement. The plurality of instructions can also cause the processor to determine a program ordering of labels of the selection control statement does not match a mathematical ordering of the labels, and execute the selection control statement with a vector of values, wherein the selection control statement is to be executed based on a jump table and a sorted unique value technique, wherein the sorted unique value technique comprises selecting at least one of the plurality of branch instructions from the jump table.

Example 24

The non-transitory computer-readable medium of Example 19, wherein the plurality of instructions cause the processor to determine the vector cost based on an instruction type of each branch instruction in the selection control statement.

Example 25

In some embodiments, a system for generating vector based selection control statements can include a processor comprising means for determining a vector cost of the selection control statement is below a scalar cost and means for determining the selection control statement is to be executed in a sorted order based on dependencies between branch instructions of the selection control statement. The processor can also include means for determining a program ordering of labels of the selection control statement does not match a mathematical ordering of the labels and means for executing the selection control statement with a vector of values, wherein the selection control statement is to be executed based on a jump table and a sorted unique value technique, wherein the sorted unique value technique comprises selecting at least one of the plurality of branch instructions from the jump table.

Example 26

The system of Example 25, wherein the processor comprises means for determining the vector cost based on an instruction type of each branch instruction in the selection control statement.

Example 27

The system of Example 25, wherein the processor comprises means for determining the vector cost of the selection control statement is greater than the scalar cost of the selection control statement and means for executing the selection control statement as a scalar loop.

Example 28

The system of Example 25, wherein the processor comprises means for detecting that the selection control statement is incompatible with a jump table technique, means for executing the selection control statement as a cascaded-if statement, and means for accumulating the scalar cost and the vector cost.

Example 29

The system of Example 25, wherein the processor comprises means for determining that branch instructions of the selection control statement are not dependent, and means for executing the selection control statement based on an unsorted jump table.

Example 30

The system of Example 25, wherein the processor comprises means for determining that the mathematical ordering of the selection control statement does match the program ordering or the selection control statement, and means for executing the selection control statement based on a sorted jump table.

Example 31

The system of Example 25, wherein the processor comprises means for evaluating the scalar cost and the vector cost based on an estimation of a number of unique cases from static or dynamic profile data.

Example 32

The system of Example 31, wherein the processor comprises means for updating the scalar cost and the vector cost based on the estimation.

Example 33

The system of Example 25, 26, 27, 28, 29, or 30, wherein the processor comprises means for converting a subset of the selection control statement into a cascaded-if statement.

Example 34

The system of Example 25, 26, 27, 28, 29, or 30, wherein the processor comprises means for generating the jump table from a cascaded-if statement.

Example 35

The system of Example 25, 26, 27, 28, 29, or 30, wherein a control divergence check is bounded by a number of unique cases within a single vector.

Example 36

The system of Example 25, 26, 27, 28, 29, or 30, wherein the processor comprises means for vectorizing an indirect call by inlining a subset of candidate callees using the jump table.

Example 37

In some embodiments, a method for generating vector based selection control statements can include determining a vector cost of the selection control statement is below a scalar cost and determining the selection control statement is to be executed in a sorted order based on dependencies between branch instructions of the selection control statement. The method can also include determining a program ordering of labels of the selection control statement does not match a mathematical ordering of the labels, and executing the selection control statement with a vector of values, wherein the selection control statement is to be executed based on a jump table and a sorted unique value technique, wherein the sorted unique value technique comprises selecting at least one of the plurality of branch instructions from the jump table.

Example 38

The method of Example 37 comprising determining the vector cost based on an instruction type of each branch instruction in the selection control statement.

Example 39

The method of Example 37 comprising determining that branch instructions of the selection control statement are not dependent, and executing the selection control statement based on an unsorted jump table.

Example 40

The method of Example 37 comprising determining that the mathematical ordering of the selection control statement does match the program ordering or the selection control statement, and executing the selection control statement based on a sorted jump table.

Example 41

The method of Example 37 comprising evaluating the scalar cost and the vector cost based on an estimation of a number of unique cases from static or dynamic profile data.

Example 42

The method of Example 41, comprising updating the scalar cost and the vector cost based on the estimation.

Example 43

The method of Example 37, 38, 39, or 40 comprising converting a subset of the selection control statement into a cascaded-if statement.

Example 44

The method of Example 37, 38, 39, or 40 comprising generating the jump table from a cascaded-if statement.

Example 45

The method of Example 37, 38, 39, or 40, wherein a control divergence check is bounded by a number of unique cases within a single vector.

Example 46

The method of Example 37, 38, 39, or 40 comprising vectorizing an indirect call by inlining a subset of candidate callees using the jump table.

Example 47

In some embodiments, a non-transitory computer-readable medium for generating vector based selection control statements can include a plurality of instructions that in response to being executed by a processor, cause the processor to determine a vector cost of the selection control statement is below a scalar cost and determine the selection control statement is to be executed in a sorted order based on dependencies between branch instructions of the selection control statement. The plurality of instructions can also cause the processor to determine a program ordering of labels of the selection control statement does not match a mathematical ordering of the labels, and execute the selection control statement with a vector of values, wherein the selection control statement is to be executed based on a jump table and a sorted unique value technique, wherein the sorted unique value technique comprises selecting at least one of the plurality of branch instructions from the jump table.

Example 48

The non-transitory computer-readable medium of Example 47, wherein the plurality of instructions cause the processor to determine the vector cost based on an instruction type of each branch instruction in the selection control statement.

Although an example embodiment of the disclosed subject matter is described with reference to block and flow diagrams in FIGS. 1-4, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by auxiliary processing devices that are linked through a communications network.

Although operations may be described as a sequential process, some of the operations may in fact be performed in parallel, concurrently, and/or in a distributed environment, and with program code stored for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A system for generating vector based selection control statements comprising:
   a processor to:
      determine that a vector cost of a selection control statement is below a scalar cost of the selection control statement according to an execution time of the selection control statement as a vector of values that are evaluated simultaneously and an execution time of the selection control statement via scalar execution techniques;
      determine that the selection control statement is to be executed in a sorted order based on dependencies between a plurality of branch instructions of the selection control statement;
      in response to the determination of the sorted order, determine that a program ordering of labels of the selection control statement does not match a mathematical ordering of the labels; and
      in response to the determination that a program ordering of labels of the selection control statement does not match a mathematical ordering of the labels, execute the selection control statement with a vector of values that are evaluated simultaneously, wherein the selection control statement is to be executed based on a jump table and a sorted unique value technique, wherein the sorted unique value technique comprises selecting at least one of the plurality of branch instructions from the jump table in a non-linear manner, wherein the jump table is generated based on labels of the selection control statement.

2. The system of claim 1, wherein the processor is to determine the vector cost based on an instruction type of each branch instruction in the selection control statement.

3. The system of claim 1, wherein the processor is to:
   determine the vector cost of the selection control statement is greater than the scalar cost of the selection control statement; and
   execute the selection control statement as a scalar loop.

4. The system of claim 1, wherein the processor is to:
   detect that the selection control statement is incompatible with a jump table technique;
   execute the selection control statement as a cascaded-if statement; and
   accumulate the scalar cost and the vector cost.

5. The system of claim 1, wherein the processor is to:
   determine that the branch instructions of the selection control statement are not dependent; and
   execute the selection control statement based on an unsorted jump table.

6. The system of claim 1, wherein the processor is to:
   determine that the mathematical ordering of the selection control statement does match the program ordering of the selection control statement; and execute the selection control statement based on a sorted jump table.

7. The system of claim 1, wherein the processor is to evaluate the scalar cost and the vector cost based on an estimation of a number of unique cases from static or dynamic profile data.

8. The system of claim 7, wherein the processor is to update the scalar cost and the vector cost based on the estimation.

9. The system of claim 1, wherein the processor is to convert a subset of the selection control statement into a cascaded-if statement.

10. The system of claim 1, wherein the processor is to generate the jump table from a cascaded-if statement.

11. The system of claim 1, wherein the jump table comprises a control divergence check that is bounded by a number of unique cases within a single vector.

12. The system of claim 1, wherein the processor is to vectorize an indirect call by inlining a subset of candidate callees using the jump table.

13. A method for generating vector based selection control statements comprising:
determining that a vector cost of a selection control statement is below a scalar cost of the selection control statement according to an execution time of the selection control statement as a vector of values and an execution time of the selection control statement via scalar execution techniques;
determining that the selection control statement is to be executed in a sorted order based on dependencies between a plurality of branch instructions of the selection control statement;
in response to the determination of the sorted order, determining that a program ordering of labels of the selection control statement does not match a mathematical ordering of the labels; and
in response to the determination that a program ordering of labels of the selection control statement does not match a mathematical ordering of the labels, executing the selection control statement with a vector of values that are evaluated simultaneously, wherein the selection control statement is to be executed based on a jump table and a sorted unique value technique, wherein the sorted unique value technique comprises selecting at least one of the plurality of branch instructions from the jump table in a non-linear manner, wherein the jump table is generated based on labels of the selection control statement.

14. The method of claim 13 comprising determining the vector cost based on an instruction type of each branch instruction in the selection control statement.

15. The method of claim 13 comprising:
determining that branch instructions of the selection control statement are not dependent; and
executing the selection control statement based on an unsorted jump table.

16. The method of claim 13 comprising:
determining that the mathematical ordering of the selection control statement does match the program ordering of the selection control statement; and
executing the selection control statement based on a sorted jump table.

17. The method of claim 13 comprising evaluating the scalar cost and the vector cost based on an estimation of a number of unique cases from static or dynamic profile data.

18. The method of claim 17, comprising updating the scalar cost and the vector cost based on the estimation.

19. The method of claim 13 comprising converting a subset of the selection control statement into a cascaded-if statement.

20. The non-transitory computer-readable medium of claim 19, wherein the plurality of instructions cause the processor to determine the vector cost based on an instruction type of each branch instruction in the selection control statement.

21. The method of claim 13 comprising generating the jump table from a cascaded-if statement.

22. The method of claim 13, wherein the jump table comprises a control divergence check that is bounded by a number of unique cases within a single vector.

23. The method of claim 13 comprising vectorizing an indirect call by inlining a subset of candidate callees using the jump table.

24. A non-transitory computer-readable medium for generating vector based selection control statements comprising a plurality of instructions that in response to being executed by a processor, cause the processor to:
determine that a vector cost of a selection control statement is below a scalar cost of the selection control statement according to an execution time of the selection control statement as a vector of values and an execution time of the selection control statement via scalar execution techniques;
determine that the selection control statement is to be executed in a sorted order based on dependencies between a plurality of branch instructions of the selection control statement;
in response to the determination of the sorted order, determine that a program ordering of labels of the selection control statement does not match a mathematical ordering of the labels; and
in response to the determination that a program ordering of labels of the selection control statement does not match a mathematical ordering of the labels, execute the selection control statement with a vector of values that are evaluated simultaneously, wherein the selection control statement is to be executed based on a jump table and a sorted unique value technique, wherein the sorted unique value technique comprises selecting at least one of the plurality of branch instructions from the jump table in a non-linear manner and the jump table is generated based on labels of the selection control statement.

* * * * *